United States Patent [19]

Schumacher

[11] Patent Number: 4,644,126

[45] Date of Patent: Feb. 17, 1987

[54] METHOD FOR PRODUCING PARALLEL-SIDED MELT ZONE WITH HIGH ENERGY BEAM

[75] Inventor: Berthold W. Schumacher, Dearborn, Mich.

[73] Assignee: Ford Motor Company, Dearborn, Mich.

[21] Appl. No.: 681,721

[22] Filed: Dec. 14, 1984

[51] Int. Cl.$^4$ ............................................. B23K 15/00
[52] U.S. Cl. ...................... 219/121 ED; 219/121 LD; 219/121 EU; 219/121 EM; 219/121 LV
[58] Field of Search ................ 219/121 EC, 121 ED, 219/121 EM, 121 LM, 121 LC, 121 LD, 137 R, 121 LU, 121 LV, 121 LW, 121 EU, 121 EV

[56] References Cited

U.S. PATENT DOCUMENTS

| 3,794,807 | 2/1974 | Bailey et al. | 219/121 ED |
| 4,160,150 | 7/1979 | Konig | 219/121 ED |
| 4,328,410 | 5/1982 | Slivinsky et al. | 219/121 LW |

FOREIGN PATENT DOCUMENTS

| 0101596 | 8/1979 | Japan | 219/121 LW |

*Primary Examiner*—M. H. Paschall
*Attorney, Agent, or Firm*—Joseph W. Malleck; Roger L. May

[57] ABSTRACT

A method is disclosed for controlling a high energy radiation beam to produce a melt zone with parallel sides in a workpiece having first and second opposed surfaces between which the zone extends. The method comprises (a) directing the beam at a slight angle to the normal through the first surface of the workpiece with the focus of the beam being at or adjacent the second surface; (b) oscillating the beam and workpiece relative to each other about a point located on the beam axis at or adjacent the first surface and in a plane perpendicular to the lateral line of advancement of the directed beam so that opposite sides of the melt zone in the plane will each be sequentially rotated to assume an orientation substantially perpendicular to the first surface; and (c) laterally advancing the directed beam along a on the first surface of the workpiece while carrying out the oscillations of step (b) at a selected frequency above a minimum.

8 Claims, 8 Drawing Figures

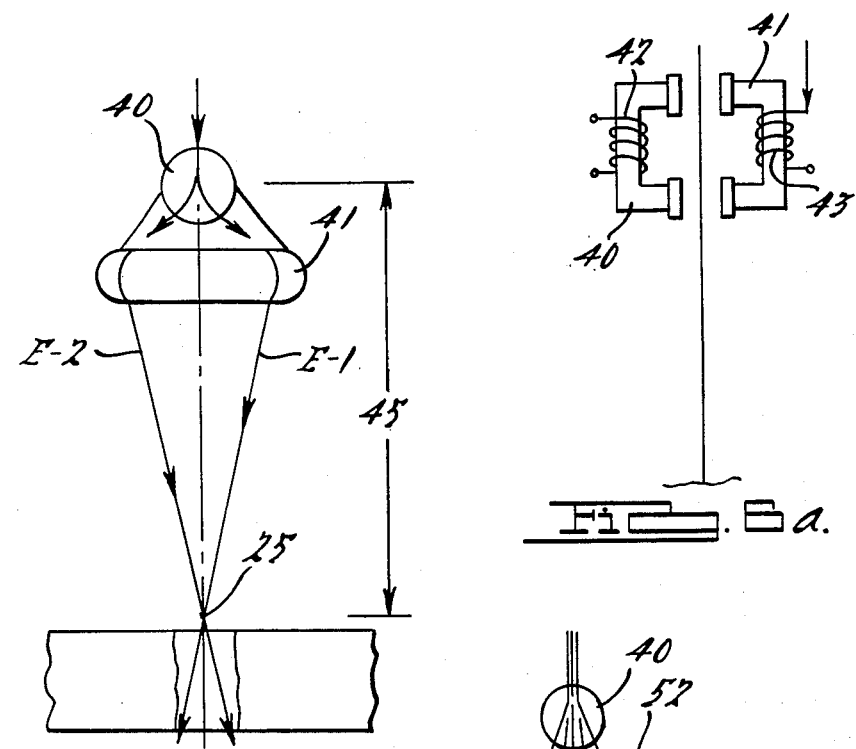
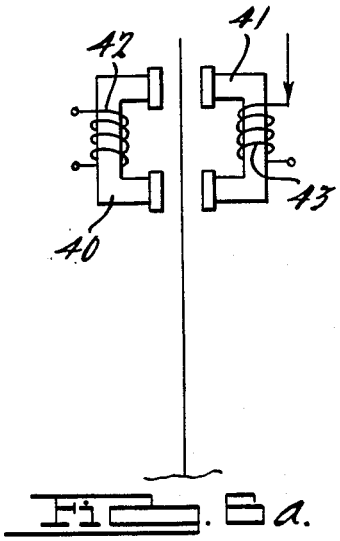
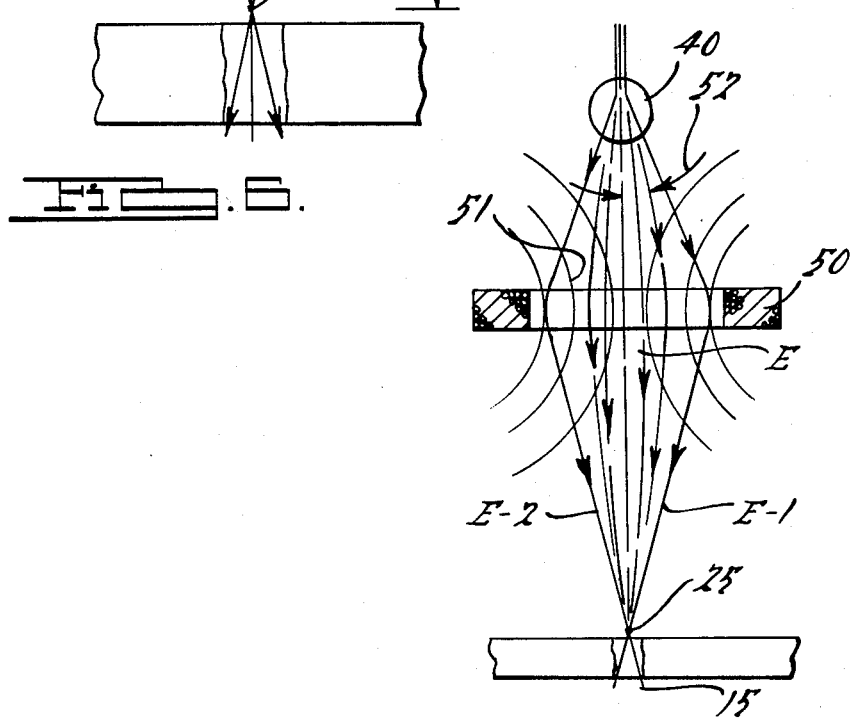

METHOD FOR PRODUCING PARALLEL-SIDED MELT ZONE WITH HIGH ENERGY BEAM

TECHNICAL FIELD

This invention relates to the use of high energy beams for melting workpieces and, more particularly, to the technology of using electron or laser beams for creating sound welds in metallic workpieces.

BACKGROUND OF THE INVENTION AND STATEMENT OF THE PRIOR ART

Autogeneous fusion welds made by a high energy beam, such as an electron beam or laser beam, usually exhibit a triangular melt zone A (in cross-section), such as shown in FIG. 1, for most process speeds selected. The upper head B of the weld is usually wider (width C) than the width (D) of the welding beam (E) itself; this is due to heat conduction from the super-heated melt which is produced in the actual beam impact area with the workpiece. As the beam burns its way through the material, it creates the triangular heat affected zone as a function of time. As a consequence of the triangular cross-section of the melt zone A, the shrinkage during solidification of the weld is not uniform. If two unrestrained plates (10-11) are joined in this way, the weldment 13 causes warpage away from plane 14, as shown in FIG. 2. If the plates are restrained as in a box structure, warpage cannot take place, but high internal stresses will develop. Such stresses will be very high at the broad side of the triangular fusion line weld and can lead to weld failure.

It would be advantageous if the high energy radiant beams can be controlled during welding so as to produce a parallel-sided fusion weld zone, thus eliminating or reducing warpage and peak stresses in the weldments.

I am unaware of any publication which teaches the control of high energy radiant beams to obtain a parallel-sided heat affected or fusion weld zone. Particle beam control in the prior art has included optical focusing of lasers for rectilinear pattern control (see U.S. Pat. No. 3,965,327) and has included the use of masks over the workpiece to eliminate need for precise optics (see U.S. Pat. No. 3,742,182). These patents fail to disclose a means of oscillating the beam in a manner to obtain a parallel-sided melt zone. In Japanese Pat. Nos. 54-101596 and 54-116356, there is utilized an oscillating beam control to obtain a sinusoidal or spiral pattern for the print of the heat affected zone, but they do not teach how to obtain parallel-sided weld or melt zones. All of the melt or heat affected zones of these patents contain the typical and conventional V-shaped cross-section because the teachings do not provide anything that would compensate for such shape.

SUMMARY OF THE INVENTION

The invention is a method of controlling a high energy radiation beam to produce a melt zone with parallel sides in a workpiece having first and second opposed surfaces between which the melt zone extends. The method comprises the steps of: (a) directing the particle beam at a small angle to the normal through the first surface of the workpiece, with the focus of the beam being at or adjacent the second surface to preferably generate a conically-shaped melt zone in the workpiece with the apex of said cone being substantially at or adjacent the second surface; (b) oscillating the beam and workpiece relative to each other about a point located on the beam axis at or adjacent the first surface and in a plane perpendicular to the lateral line of advancement of the directed beam so that opposite sides of the melt zone in the plane will each be sequentially rotated to assume an orientation substantially perpendicular to the first surface; and (c) laterally advancing the directed beam along a path on the first surface of the workpiece while carrying out the oscillations of step (b) at a selected frequency above a minimum. Preferably, the frequency should be high when compared with the travel speed of the beam.

Preferably, the workpiece is a pair of metal parts to be welded at a seam, the seam constituting the path for laterally advancing the directed beam, and the melt zone enveloping such seam. Advantageously, both the first and second surfaces are parallel, and the sides of the resultant melt zone are substantially perpendicular to both such surfaces.

The oscillations may be carried out by optically controlling the source of the beam to shift the beam axis about the point of oscillation or using magnetic coils to deflect the beam axis about the point of oscillation. Alternatively, the workpiece itself may be tilted relative to the fixed beam causing the beam to assume a different angular orientation with respect to the melt zone first established.

SUMMARY OF THE DRAWINGS

FIG. 6 is still another alternative mode for effecting oscillation of the particle beam, varying differential magnetic fields are used to shift the beam axis;

FIG. 6a illustrates side elevational view of magnets; and

FIG. 7 is still another alternative embodiment, illustrating the use of a magnetic lens to shift the particle beam axis.

DETAILED DESCRIPTION AND BEST MODE

To provide parallel-sided melt zones in a metal workpiece, the invention herein contemplates controlling the relationship between the high energy particle or laser beam and the workpiece so that the cross-section of the melt zone is oscillated at a high frequency along the seam or weld line and in the plane of the cross-section so that opposite sides of the melt zone assume a substantially perpendicular position relative to the surface through which the beam enters the workpiece. Therefore, as the beam axis is advanced along the seam or weld lines, the extremities of the oscillations create a flat-sided melt zone which overcomes the problems of warpage in an unrestrained structure or heat stress in a restrained structure.

Figure 1:
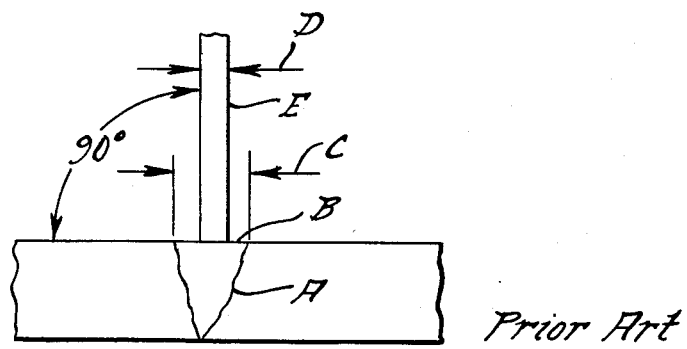
FIG. 1 is a cross-sectional schematic illustration of a typical workpiece subjected to a particle beam creating a melt zone in accordance with prior art.

High energy radiation beams with which this invention is concerned are primarily of the electron or laser beam type, but may include, within the definition, proton or helium ion beams from a duo-plasmatron. These beams will melt and subsequently weld all metals if focused to a high enough power density. The beams are characterized by a high radiance, typically $10^6$ to $10^8$ Watt cm$^{-2}$sr$^{-1}$ for a laser beam and $10^8$ to $10^{11}$ Watt cm$^{-2}$sr$^{-1}$ for an electron beam. If a beam with a radiance of $W^* = 10^8$ W cm$^{-2}$sr$^{-1}$ is focused to an angular cone of $2\pi\alpha^2$, alpha being the half aperture angle of the cone, then the focal spot has a power density of $N^* = 2\pi\alpha^2 W^*$. If $\alpha = 0.01$ rad (or 0.57 degree), we get $N^* = 6.3 \times 10^4$ W cm$^{-2}$. If we increase the aperture of the focusing cone to $\alpha = 20°$, the power density becomes 10 MW cm$^{-2}$. The power in the beam is another, independently controllable quantity and can range from 100 W to 100 KW. Such beams are used routinely today for welding. The impact alignment of these beams, according to the present state of the art, is normal to the workpiece surface and this results in the triangular melt zone as shown in FIG. 1.

Particle beams (electron) of this nature have particle energy changing with the square of the velocity and have thermal energy causing an elementary beam cone to be emitted from each single point of the source. At larger distances from a finite sized source, any particle beam of this type exhibits a thermal beam spread and always has a finite angular aperture. In fact, a "parallel" beam could not carry any energy; all deductions based on the assumption of "laminar" flow of the electrons in a beam are therefore simply incorrect. Because of this beam spread, there must be some means for focusing the elementary rays of the particle beam and this is usually carried out by the use of lenses which can include electrostatic or magnetic means.

Figure 2:
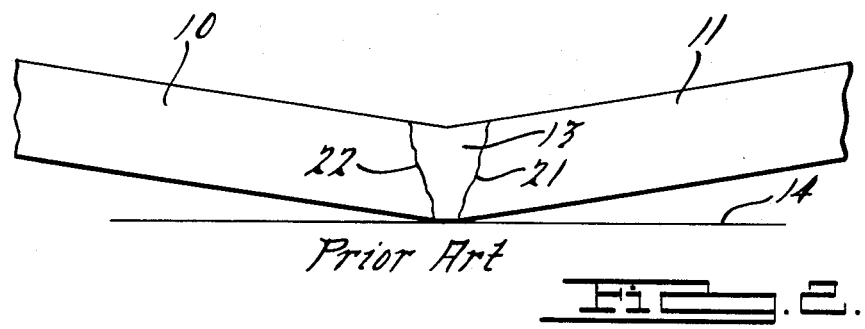
FIG. 2 is a view similar to FIG. 1, illustrating the weldment after solidification.
Figure 3:
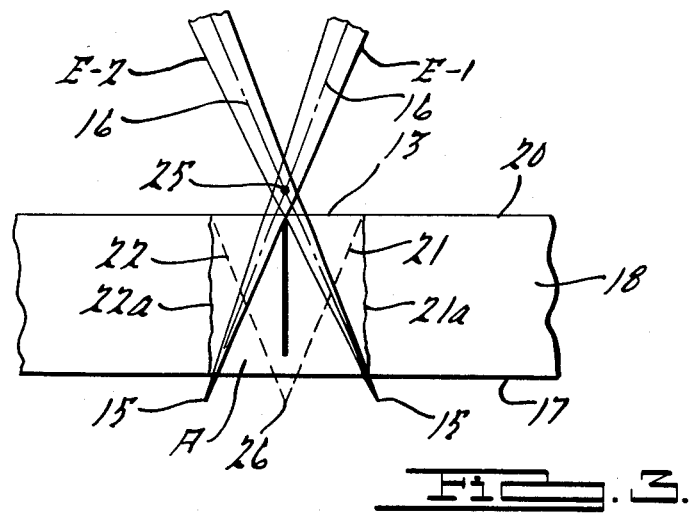
FIG. 3 is a somewhat enlarged view similar to that of FIGS. 1 and 2, illustrating the scope of oscillation of the particle beam in accordance with the method of this invention to thereby create a parallel-sided melt zone.

Focusing creates an energy concentration effective to melt the material and creates the melt zone previously described. As shown in FIG. 3, such focused beams have a conical configuration which draws together the rays at a focus point 15 along its beam axis 16. It is this focus point 15 or cross-over of the elementary ray cones which should be located at or adjacent the lower surface 17 of a flat metal workpiece 18. Thus, an autogeneous fusion weld made by a laser electron beam E will exhibit usually a triangular melt zone A or a V-shaped configuration, as shown in FIG. 1. The upper head B of the melt zone is wider than the bottom because heat conduction from the super-heated melt, in the direct path of the beam, is produced in the actual beam impact area. As the beam burns its way through the material, it creates the triangular melt zone as a function of time. As a consequence of the triangular or V-shaped cross-section of the melt zone, shrinkage during solidification is not uniform and the two separated parts of the assembly to be welded will warp in a fashion as shown in FIG. 2.

Unique oscillation of the beam relative to the workpiece overcomes this problem. The sides 21 and 22 of the V-shaped melt zone are reoriented so that such sides are swung to a new position (22a and 21a) substantially perpendicular to the upper surface 20 (and preferably also to the lower surface 17) of the workpiece. The extremities 21a and 22a of these oscillations, when joined together as the beam is advanced along a lateral path relative to the workpiece, forms straight planar sides. If the oscillations are carried out so that the beam is first swung to a position E-1 and then to a position E-2, each side of the weld zone V zone is brought to a perpendicular position relative to the upper surface 20. The result is a parallel-sided zone as shown in FIG. 3. The oscillations should be at a selected frequency above a minimum. At least one oscillation should take place while the beam's peak spot has moved a distance along the weld path equal to its diameter. For example, if the spot size is 1 mm and the traveling speed (welding speed) is 100 mm/sec, then one oscillation should take place every 1/100 of a second. This minimum corresponds to an oscillating frequency of 100 cycles/sec. At such frequency and any frequency higher than that, the derived melt zone will have parallel sides.

Two criteria are important to the function of such relative oscillation at each station along the lateral path of the beam. First, the focus 15 of the beam E should be at or adjacent the lower or second surface 17 of the workpiece; it is this beam focus 15 which is moved during oscillation to traverse a distance substantially commensurate to the width C of the upper interface of the melt zone aligned with the first surface). The second criteria is that the point 25 on the beam axis 16, about which the beam is shifted or oscillated relative to the workpiece, should be at or adjacent the upper or first surface 20 of the workpiece. It is preferable that such point of rotation or oscillation be slightly above the first surface so that the sides of the weldment are as close to a straight line in cross-section as possible. Similarly, it is advantageous if the focus is slightly below the second surface to more easily achieve the same result.

The method particularly comprises controlling a high energy radiant beam E to produce a melt zone A with parallel sides (21a–22a) in a workpiece 18 having first and second opposed surfaces (20–17) between which the melt zone extends, by the steps of: (a) directing the particle beam E along an axis 16 through the first surface of the workpiece with the focus 15 of the beam E being at or adjacent the second surface 17 and the beam generating a conical melt zone A in the workpiece 18 with the apex 26 of the cone being substantially at or adjacent the second surface 17; (b) oscillating the beam and workpiece (as shown in FIGS. 3 and 4) relative to each other about a point 25 on the axis 16 at or adjacent the first surface 20 and in a plane 27 perpendicular to the lateral line of advancement 28 of the directed beam E so that opposite sides 21–22 of the conical melt zone in the plane 28 will each be rotated to assume an orientation 21a–22a substantially perpendicular to the first surface 20; and (c) laterally advancing the directed beam along a series of points 29 to define a path 28 relative to the workpiece while carrying out the oscillations of step (b) while traveling along path 28.

Figure 4:
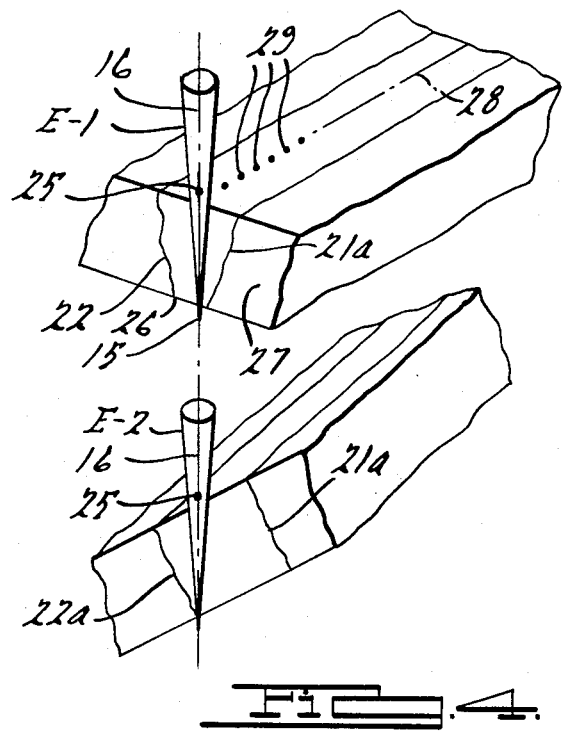
FIG. 4 is a composite of two sequential views similar to FIGS. 1-3, illustrating a first alternative mode for effecting the oscillation of said particle beam relative to the workpiece, the workpiece is manipulated relative to a stationary particle beam.

As shown in FIG. 4, the workpiece may be periodically tilted with an appropriate frequency (the latter, of course, being higher for faster welding speeds and lower for slower welding speeds). Such tilting should be arranged so that as the beam axis 16 remains stationary, the melt zone A will be shifted so that its side in any cross-sectional plane will assume a perpendicular relationship with respect to the upper and lower surfaces of the workpiece.

Figure 5:
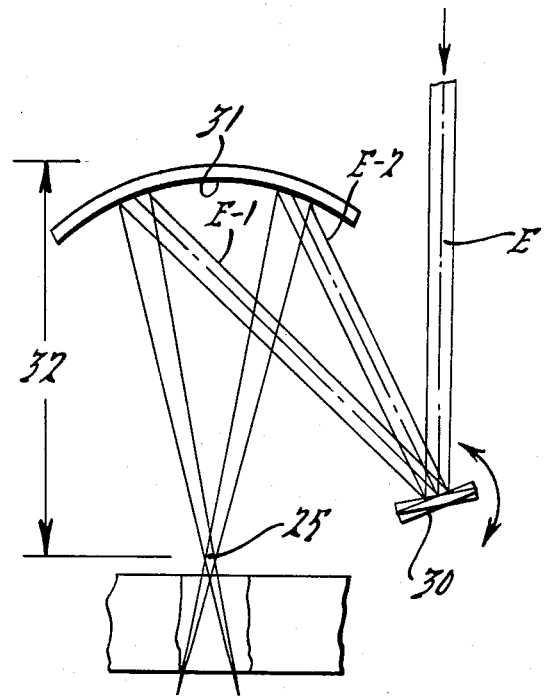
FIG. 5 is a view similar to FIG. 3, illustrating a second alternative mode for carrying out the oscillation of the particle beam, optics are used to shift the particle beam axis.

As shown in FIG. 5, the beam alternatively may be oscillated by deflecting the beam E through the use of a rotating or oscillating mirror 30, the resultant reflected beam E-1 or E-2 then being focused by a curved mirror 31. The beam reflecting from the curved mirror will hit the point of oscillation 25 from various directions as so desired. The focal length 32 of the curved mirror 31 should be approximately twice its curvature if the beam is nearly a parallel beam.

In FIG. 6 there is shown still another alternative mechanism for bringing about the oscillation of the beam relative to the workpiece. Magnets 40-41 are used to create two magnetic fields which can be varied in strength and direction. The first field is directed opposite to the second magnetic field. If the current and windings are judiciously chosen, one and the same magnetizing current can drive both coils 42 and 43; the current is, of course, an alternating current. The intensity ratio of the two magnetic fields must be changed if the workpiece distance 45 changes. The difference in magnetic fields creates a deflection effect upon the beam depending upon the strength and polarity of the two fields Yet still another method for deflecting or refocusing the beam is shown in FIG. 7. A first deflection by the angle 52 is produced by the magnet 40 (as before in FIG. 6). The angle 52 varies with the strength of the magnetic field produced by 40. A second deflector (counter-deflection) is then produced by the magnetic lens 50. It images the center of the field 40 onto the workpiece at point 25. The lens field has *constant* strength, i.e., the current through lens 50 is constant, which is a generally simpler situation than before, where the field current for 41 (FIG. 6) had to be varied in unison with the field current of 40. In FIG. 7, only the current through magnet 40 has to be varied to oscillate the beam, the lens action of 50 will always bring it back to point 25, regardless of how it goes through the lens 50, whether by path E1 or E2. The constant field strength of the lens determines the position of the focal point 15. This focal point can be adjusted independently of the variations in the magnetic lens by changing the excitation (lens current) of 50. This permits an easy, empirical adjustment of the focus. The magnetic lens should be of a type which does not rotate the image as a simple solenoid type of lens would do. Tandum lenses which hold the final image rotation to zero are well known in the art and can be used here.

I claim:

1. A method of providing a parallel-sided melt zone in a metal workpiece having an entrance and an exit surface, said entrance surface being subjected to a high energy radiation beam focused during the period of said directing at a predetermined fixed location along the beam's axis at or adjacent said exit surface, comprising (i) translating the axis of said beam laterally along a path on said surface while (ii) controlling the relationship between the workpiece and beam so that said beam axis oscillates through an angle to the normal of said surface at a selected minimum frequency, the extremities of said oscillation being limited to define sides of the melt zone which assume a substantially perpendicular position relative said surface.

2. The method as in claim 1, in which the workpiece is a pair of metal parts to be welded at a seam, the melt zone enveloping said seam.

3. The method as in claim 1, in which said beam is a laser beam and in which step (b) is carried out by optically controlling said source of said beam to shift the beam axis about said point.

4. The method as in claim 1, using a charged particle beam and in which in step (b) said oscillation is carried out by use of magnetic fields effective to selectively shift the beam axis about said point.

5. The method as in claim 1, using a charged particle beam and in which in step (b) said oscillation is carried out by use of differential magnetic fields commonly supplied by the same current and which in combination are effective to shift the beam axis about said point.

6. A method for controlling a high energy beam to produce a melt zone with parallel sides in a workpiece having a first surface through which the beam enters the workpiece and a second surface opposed to said first surface, the method comprises the steps of:
(a) directing said beam substantially parallel to the normal through said first surface of said workpiece with the focus of said beam being at or adjacent said second surface;
(b) oscillating the axis of said beam through an angle to the normal of said first surface of said workpiece and about a point located on said axis at or adjacent said first surface and in a plane perpendicular to the lateral line of advancement of the directed beam so that opposite sides of said melt zone in said plane will each be sequentially rotated to assume an orientation substantially perpendicular to the first surface; and
(c) laterally advancing said directed beam to define a path along the first surface of the workpiece while carrying out said oscillations of step (b) at a preselected frequency above a minimum.

7. A method of controlling particle beams to make a substantially parallel-sided melt zone in a workpiece having opposed first and second surfaces, said beams being focused during a period of directing at a predetermined fixed location along the beam's axis at or adjacent said second surface, comprising:
(a) directing said particle beam at said workpiece, said beam entering said workpiece through said first surface and controlling said beam to be focused at a point at or adjacent said second surface, said beam defining a conical melt zone between said first and second surfaces; and
(b) while laterally advancing the axis of said beam along a predetermined linear path, oscillating said beam about a point on the axis adjacent said first surface to cause the interface of said beam with said second surface to substantially traverse a width substantially commensurate with the width of the interface of the melt zone at said first surface.

8. The method as in claim 7, in which during oscillation a side of said melt zone is moved to assume an angle with said surface of substantially 90°.

* * * * *